(12) United States Patent
Charvet-Quemin et al.

(10) Patent No.: US 8,287,008 B2
(45) Date of Patent: Oct. 16, 2012

(54) LIQUID AND GAS TIGHT THREADED TUBULAR CONNECTION

(75) Inventors: Jean-Francois Charvet-Quemin, Valenciennes (FR); Jean-Pierre Emery, Maubeuge (FR); Takahiro Hamamoto, Chuo-ku (JP); Masaaki Sugino, Chuo-ku (JP)

(73) Assignees: Vallourec Mannesmann Oil & Gas France, Aulnoye-Aymeries (FR); Sumitomo Metal Industries, Ltd., Osaka-shi (JP)

( * ) Notice: Subject to any disclaimer, the term of this patent is extended or adjusted under 35 U.S.C. 154(b) by 1106 days.

(21) Appl. No.: 11/997,920

(22) PCT Filed: Jul. 21, 2006

(86) PCT No.: PCT/EP2006/007242
§ 371 (c)(1),
(2), (4) Date: Jul. 18, 2008

(87) PCT Pub. No.: WO2007/017082
PCT Pub. Date: Feb. 15, 2007

(65) Prior Publication Data
US 2008/0265575 A1 Oct. 30, 2008

(30) Foreign Application Priority Data
Aug. 9, 2005 (FR) ...................................... 05 08456

(51) Int. Cl.
*F16L 15/00* (2006.01)

(52) U.S. Cl. ....................................... 285/333; 285/334

(58) Field of Classification Search .......... 285/333–334, 285/355, 390
See application file for complete search history.

(56) References Cited

U.S. PATENT DOCUMENTS

| | | | | |
|---|---|---|---|---|
| 2,907,589 | A * | 10/1959 | Knox | 285/95 |
| 2,992,019 | A * | 7/1961 | MacArthur | 285/110 |
| 3,856,337 | A * | 12/1974 | Ehm et al. | 285/334 |
| 3,870,351 | A | 3/1975 | Matsuki | |
| 4,009,893 | A * | 3/1977 | Schatton et al. | 285/110 |
| 4,153,283 | A * | 5/1979 | Hellmund et al. | 285/334 |
| 4,623,173 | A * | 11/1986 | Handa et al. | 285/333 |
| 4,732,416 | A | 3/1988 | Dearden et al. | |
| 4,958,862 | A * | 9/1990 | Cappelli et al. | 285/334 |
| 4,984,829 | A * | 1/1991 | Saigo et al. | 285/334 |
| 5,549,336 | A | 8/1996 | Hori et al. | |
| 6,045,165 | A * | 4/2000 | Sugino et al. | 285/333 |
| 6,237,967 | B1 * | 5/2001 | Yamamoto et al. | 285/333 |
| 2002/0021006 | A1 | 2/2002 | Mallis | |
| 2004/0108719 | A1 * | 6/2004 | Carcagno et al. | 285/333 |
| 2004/0262919 | A1 * | 12/2004 | Dutilleul et al. | 285/333 |

(Continued)

FOREIGN PATENT DOCUMENTS
DE 40 35 684 A1 5/1992

(Continued)

*Primary Examiner* — Aaron Dunwoody
*Assistant Examiner* — Fannie Kee
(74) *Attorney, Agent, or Firm* — Oblon, Spivak, McClelland, Maier & Neustadt, L.L.P.

(57) ABSTRACT

A liquid and gas tight threaded tubular connection includes a first axial abutment surface formed at the free end of an annular lip of a threaded male element and a second axial abutment surface formed at the end of a housing of a threaded female element. The first and second axial abutment surfaces have the same axial half-sections, the inclination of which varies progressively in the radial direction.

16 Claims, 3 Drawing Sheets

U.S. PATENT DOCUMENTS

2008/0012321 A1  1/2008  Roussie

FOREIGN PATENT DOCUMENTS

| | | |
|---|---|---|
| EP | 0 916 883 A1 | 5/1999 |
| EP | 0 949 441 A1 | 10/1999 |
| GB | 2 074 685 A | 11/1981 |
| GB | 2 329 685 A | 3/1999 |
| JP | 56-143889 | 11/1981 |
| JP | 60-26878 | 2/1985 |
| WO | 03 048623 | 6/2003 |

\* cited by examiner

LIQUID AND GAS TIGHT THREADED TUBULAR CONNECTION

BACKGROUND OF THE INVENTION

1. Field of the Invention

The invention concerns a threaded tubular connection comprising a male tubular element comprising a male threading (thread profile) and a female tubular element comprising a female threading which can cooperate with the male threading on makeup, said male tubular element having a first annular axial abutment surface and a first annular sealing surface disposed on the radially outer surface of said male tubular element, said female tubular element having a second annular axial abutment surface and a second annular sealing surface disposed on the radially inner surface of said female tubular element, the first and second axial abutment surfaces coming into mutual abutment at the end of makeup while the first and second sealing surfaces come into sealing contact by radial interference, one of the first and second axial abutment surfaces, termed the distal abutment surface, being formed at the free end of a first of said tubular elements, which first element has a lip which extends axially between its threading and the distal abutment surface, and one of the first and second sealing surfaces termed the on-lip sealing surface being disposed on the lip at a non zero axial distance from the distal abutment surface.

That type of threaded tubular connection is intended for the production of strings of tubes for hydrocarbon wells or the like.

2. Description of Related Art

It has been established that in such a threaded connection, when the axial abutment surfaces are axially distanced from sealing surfaces and have a tapered form, termed inverted or with a negative apex angle, such that when they come into mutual abutment, they tend to stress the lip radially towards the surface facing the second tubular element, this in certain cases results in an increase in the contact pressure between the sealing surfaces, improving the seal of the connection against liquids and gases, while in other cases said improvement does not occur or the contact pressure may even be degraded.

Studies carried out to explain this phenomenon have shown that, for a given angle of inclination of the axial abutment surfaces, the behaviour of the lip depends on its radial thickness between the axial abutment surface and the sealing surface. If that thickness is relatively high, the stiffness of the lip is sufficient for the radial thrust exerted by the second axial abutment surface on the first axial abutment surface to be transmitted to the first sealing surface. If, in contrast, the thickness is lower, the lip is not sufficiently stiff and bends, possibly irreversibly, without transmitting the thrust to the sealing surface.

The thicknesses of the lips on the tubular elements may differ for the same nominal diameter. Further, depending on requirements, male elements having different lip thicknesses may be associated with the same female element and conversely. Thus, the problem is to define a common profile for the axial abutment surfaces which can optimize the contact between the sealing surfaces whatever the thicknesses of the male and female lip.

The invention aims to solve this problem.

European patent EP 0 488 912 describes axial abutment surfaces adjacent to the sealing surfaces.

U.S. Pat. No. 3,870,351 describes inwardly curved axial abutment surfaces the inclination of which with respect to the axis changes direction in the radial direction so that their mutual abutment can precisely position the end of the lip but applies no radial force to the whole periphery of the lip.

U.S. Pat. No. 4,611,838 describes axial abutment surfaces extending in a plane perpendicular to the axis of the connection or having a toothed profile such that they lock mutually.

International patent WO 03/048623 describes axial abutment surfaces extending in a plane perpendicular to the axis of the connection or having a constant inclination with respect to thereto, and an on-lip sealing surface axially distant from the axial abutment surfaces.

WO 2004/109173 is equivalent to the foregoing.

BRIEF SUMMARY OF INVENTION

The invention provides a connection of the type defined above in the introduction, and provides that a segment constituting at least a portion of the axial half-sections of each of the first and second axial abutment surfaces is inclined with respect to the radial direction, axially approaching said threadings with an increasing inclination so that on going from said radially outer or inner surface, said axial half-sections does not change its direction of inclination.

Optional complementary or substitutive characteristics of the invention are set out below:

- the first tubular element is the male element;
- the male tubular element also has a third annular axial abutment surface and a third annular sealing surface disposed on the radially outer sealing surface of said male tubular element; while
- said female tubular element also has a fourth annular axial abutment surface and a fourth annular sealing surface disposed on the radially inner surface of said female tubular element;
- the third and fourth axial abutment surfaces abut mutually at the end of makeup while the third and fourth sealing surfaces come into tight sealing contact by radial interference;
- the fourth axial abutment surface, also termed the distal abutment surface, is formed at the free end of the female element, which has a female lip extending axially between the female threading and the fourth axial abutment surface, and the fourth sealing surface is disposed on the female lip at a non zero axial distance from the fourth axial abutment surface;
- a segment constituting at least a portion of the axial half-sections of each of the third and fourth axial abutment surfaces is inclined with respect to the radial direction, axially approaching said threadings with an increasing inclination so that on going radially from said radially inner surface, said axial half-sections do not change their direction of inclination;
- said segment is curvilinear;
- said segment is an arc of a circle;
- the radius of said arc of a circle is in the range 20 to 100 mm;
- the maximum angle of inclination of said segment is 20° or less;
- said axial half-sections are radially orientated at their end close to said radially outer or inner surface;
- said inclined segment is radially orientated at its end close to said radially outer or inner surface where it connects to a straight radial segment which also forms part of said axial half-sections;
- the length of said straight radial segment is in the range 0.5 to 6 mm;
- a radial clearance exists between the facing surfaces of the male and female elements over said axial distance;

the on-lip sealing surface is separated from the threading by an axial distance of at most 3 pitches and preferably at most 2 pitches of the thread;
the lip is thickened locally to increase the surface area for axial abutment;
said threadings are tapered;
two cooperating sealing surfaces are tapered surfaces with the same apex angle;
two cooperating sealing surfaces are respectively a tapered surface and a rounded surface;
of said cooperating sealing surfaces, the tapered surface is said on-lip sealing surface;
said on-lip sealing surface is limited in the direction of the distal abutment surface by a break in slope;
the facing surfaces of the male and female elements comprise surfaces which are cylindrical over said axial distance.

BRIEF DESCRIPTION OF THE SEVERAL VIEWS OF THE DRAWINGS

The characteristics and advantages of the invention are given in more detail in the following description, made with reference to the accompanying drawings.

DETAILED DESCRIPTION OF THE INVENTION

Figure 1:
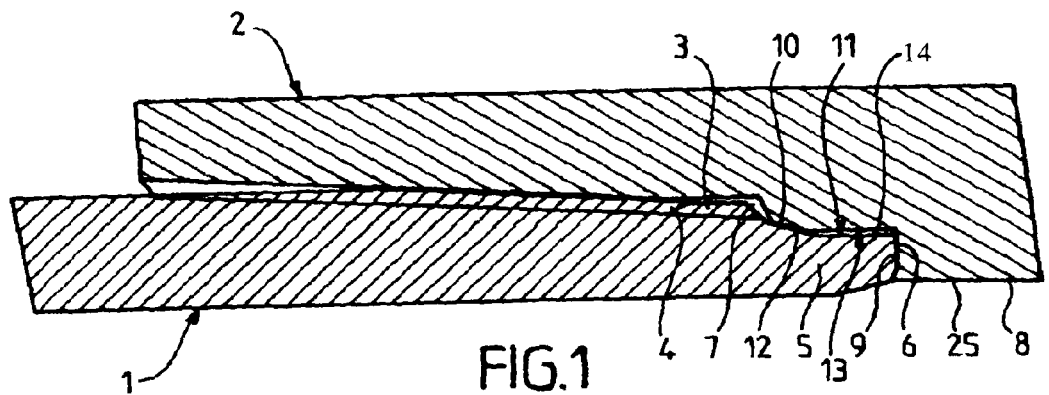
FIG. 1 is an axial half cross sectional view of a threaded tubular connection of the invention.

FIG. 1 shows part of a threaded tubular connection formed by a male tubular element 1 comprising a tapered male threading 3 and a female tubular element 2 comprising a tapered female threading 4. The male element 1 is formed at the end of a great length tube intended for forming part of a string of tubes in a hydrocarbon well, and the female element is formed either at the end of a further great length tube or at the end of a coupling provided at its other end with a further female element to connect two great length tubes together.

Beyond the threading 3, the male element 1 forms a male annular lip 5 ending in an end surface 6 which is approximately radial. A housing 7 following on from the threading 4 is formed in the female element 2 from its radially inner surfaces 8 and ends in an approximately radial end surface 9. A tapered annular sealing surface 10 is formed on the radially outer surface 11 of the lip 5 at a distance from the end surface 6, and a tapered annular sealing surface 12 is formed facing the preceding surface on the radially outer surface 13 of the housing 7.

Figure 4:
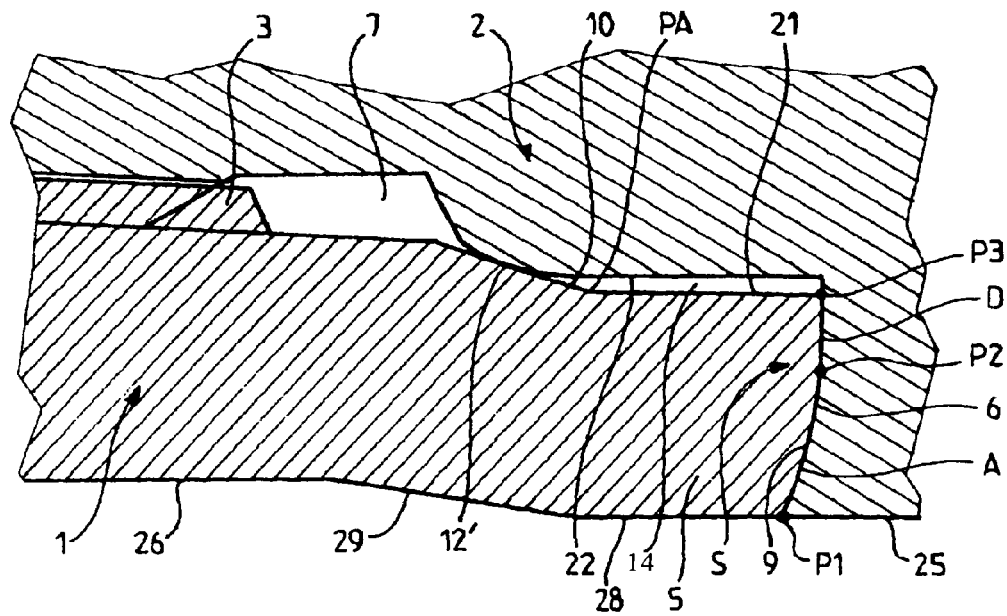

As an example, for a male element at the end of a tube with a nominal diameter of 177.8 mm (7 inches), the centre of the on-lip sealing surface 10 is located 13 mm from the end surface 6 and 3 mm from the end of the male threading 3 (i.e. about 0.6 thread pitches), so that the end surface 10 is almost adjacent to the threading. In a variation, as shown in FIG. 4, the centre of the sealing surface 10 may be located at about 1.1 thread pitches from the end of the male threading.

When the male threading 3 is made up into the female threading 4, the lip 5 penetrates progressively into the housing 7 until the end surfaces 6 and 9 come into abutment against each other. The sealing surfaces 10 and 12 then come into mutual contact with a radial interference fit, to ensure a seal against liquids and gas between the inside and outside of the threaded connection. In this final position, a radial clearance 14, for example from a few tenths of a millimeter to more than one millimeter, subsists between the surfaces 11 and 13, in the region of the length of the connection between the abutment surfaces 6, 9 and the sealing surfaces 10, 12, surfaces 11 and 13 being substantially cylindrical in this region.

In the made up position shown in FIGS. 1 and 2, the axial half-sections of surfaces 6 and 9 in mutual abutment are coincident, so that the description below is applicable to each of them. The common half-section S comprises an arc of a circle A extending from a point P1 located at the radially inner end of the half-section to an intermediate point P2. The tangent to the arc A is orientated radially at point P2 and its inclination at other points on the arc increases progressively and continuously from point P2 to point P1, the point P2 being at a further axial distance from the threadings 3, 4 than the point P1. The arc A connects at point P2 to a straight segment D, which is radially orientated, extending to a point P3 which represents the radially outer end of the half-section S. The arc A has a radius of the order of 20 to 100 mm, its radial extent (perpendicular to the axis of the threaded connection) extending to a few millimeters. To simplify FIGS. 1 and 2, the first axial abutment surface 6 is shown as connecting directly at a right angle to the cylindrical portion 21 of the radially outer surface 11 of the lip. In practice, however, these two surfaces are connected in known manner via a convex rounding. Similarly, in practice and in known manner, a concave rounding connects the second axial abutment surface 9 to the cylindrical portion 22 of the radially outer surface 13 of the housing. These roundings are intended to avoid the known disadvantages of projecting or re-entrant edges with sharp angles. Since they do not function to cooperate with each other in abutment, they do not form part of the axial abutment surfaces as defined above. In practice, point P3 forming the radially outer end of segment D is not on surface 21 and this segment is shorter in length than the radial distance between P2 and surface 21.

Figure 2:
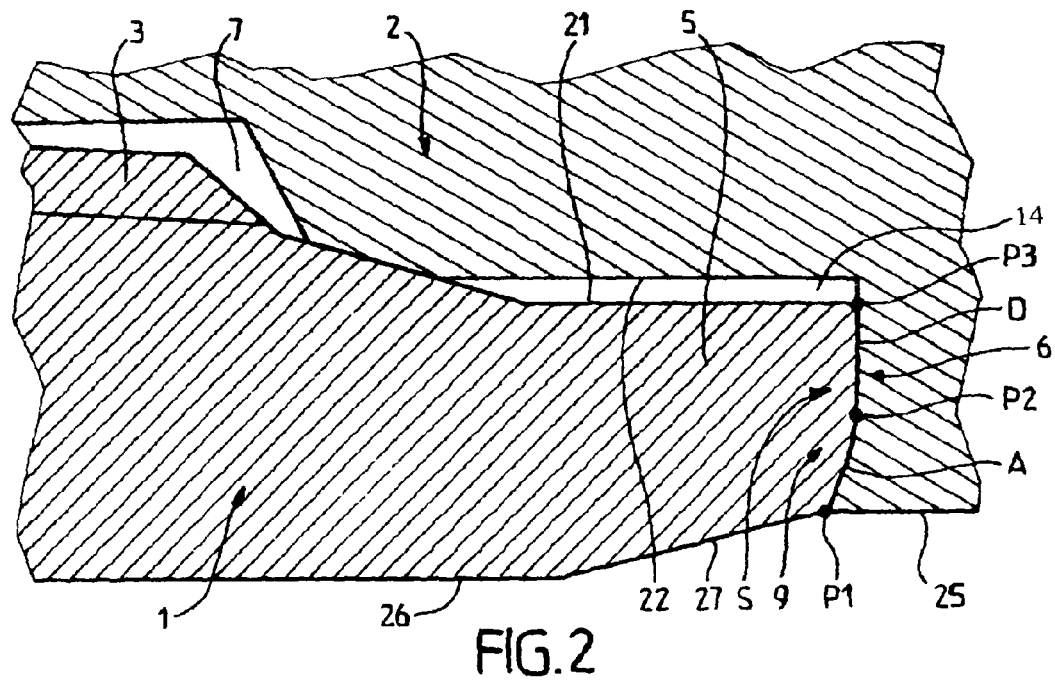
FIG. 2 is an enlarged detail of FIG. 1.

In the example shown in FIGS. 1 and 2, however, the end surface 9 of the housing extends radially beyond point P3 over a length corresponding to the radial clearance between the cylindrical portions 21 and 22, to connect directly at a right angle to the latter beyond the concave rounding.

As an example, for a threaded connection with a nominal diameter of 177.8 mm (7 inches) and a weight per length unit of 52 kg/m (35 lb/ft), the angle of inclination at point P1 may be 4.7° and the radius and radial extent of arc A are 55 mm and 4.5 mm respectively, point P2 being spaced from the cylindrical portion 21 by 1.5 mm.

The shape of segment A (an arc of a circle in FIGS. 1 and 2) is such that it acts on the abutment surfaces in the manner of tapered surfaces with a negative apex angle (reverse abutment), but in a manner which is more pronounced with increasing thickness of the lip (which varies directly with the weight per length unit of tubes assembled via the threaded connection). The angle of inclination at P1 is greater the higher the weight per length unit of the tubes. In the case of heavy tubes (high weight per length unit), this results in a large radial outward thrust of the free end of the lip 5, which thrust is transmitted effectively to the sealing surface 10 due to the stiffness of the lip, to increase the contact pressure between the sealing surfaces 10 and 12. In the case of lightweight tubes, the low angle of inclination at P1 limits the radial thrust at the end of the lip, which in any case would not be transmitted to the sealing surface 10 because of the relative thinness of the lip and the axial distance between the sealing surface 10 and the axial abutment surface 6, which would bend the lip 5 in a disadvantageous manner.

Segment A (here an arc) can thus optimize the contact pressure between sealing surfaces regardless of the weight per length unit of the tubes to be assembled.

It will be advantageous to select a radius for the arc of a circle which is larger with increasing outer diameter of the tubes.

In the prior art, since the tapered axial abutment surfaces make an angle with the radial direction which is generally limited to 20°, the angle of inclination at P1 with the radial direction will be advantageously limited to 20°.

Segment D facilitates inspection of threaded connections, in particular their dimensional inspection, as it is easier to position an inspection device against a flat surface than against a domed surface.

The length of segment D may advantageously vary with the outer diameter of the tubes.

For a given outer tube diameter, the length of segment D will be advantageously identical for various linear densities, such that the position of point P2 remains constant.

In the example of FIGS. 1 and 2, the axial half-sections of the end surfaces 6 and 9 of the lip and the housing extend radially inwardly to the same point P1, said annular surfaces consequently having the same inner diameter. This diameter corresponds to the diameter of the cylindrical inner surface 25 of the female element. In contrast, the male element has a cylindrical inner surface 26 which is generally not machined the diameter of which thus varies substantially compared with the outer diameter of the tubes. For this reason, the point P1 is advantageously located at a larger diameter than that of the surface 26, obtained by machining. The connection between the cylindrical surface 26 and the radial surface 6 is made via a machined chamfer, for example a tapered chamfer 27 the half-sectional profile of which extends from point P1 over a fraction of the length of the lip 5. Other known types of connection may also be used, however.

Figure 3:
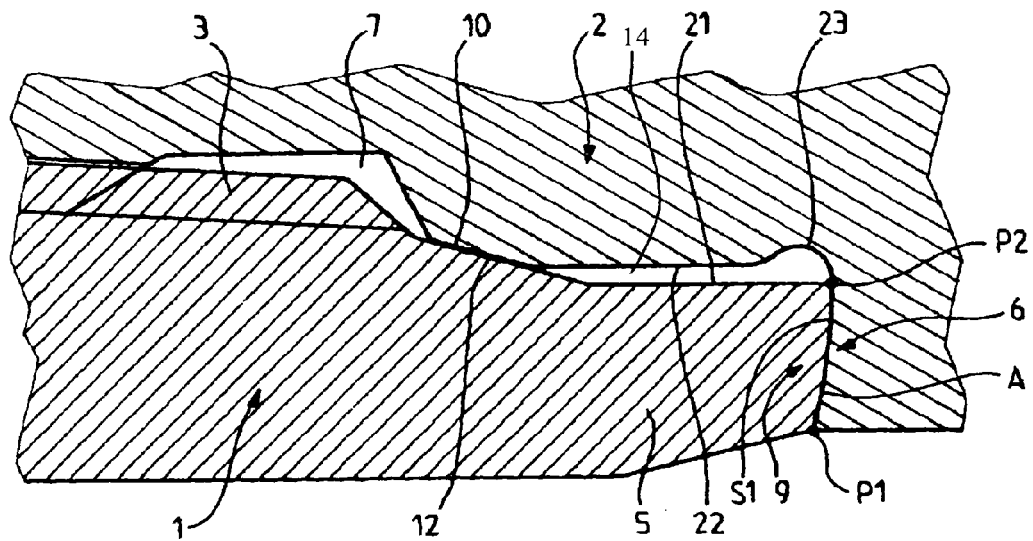
FIGS. 3 to 6 are views which are analogous to FIG. 2, showing variations of the connection of the invention.

FIG. 3 differs from FIG. 2 in that the straight segment D has been cancelled, the half-section S1 of the two axial abutment surfaces being coincident with the arc of a circle A.

Further, FIG. 3 shows a concave large radius rounding forming a groove 23 in the cylindrical surface 22. The sole purpose of said groove is to facilitate machining of the housing 7.

Said concave rounding and said groove may advantageously be used in other embodiments of the invention, in particular those illustrated in the other figures.

FIG. 4 differs from FIG. 2 in that the diameter of the inner cylindrical surface 26 of the tube to which the male element 1 belongs is greater than the diameter of the inner cylindrical surface 25 of the female element 2. Reduction swaging is carried out to bring the inner diameter of the free end of the lip 5 below the diameter of the surface 25, and an inner cylindrical surface 28, with the same diameter as the surface 25, adjacent to the free end of the lip, is formed by machining, said surface 28 connecting to the surface 26 via a substantially tapered surface 29 resulting from said reduction swaging. Here again, the same point P1 represents the radially inner end of the axial half-sections of the end surfaces 6 and 9 of the lip 5 and housing 7. For tubes having the nominal characteristics shown with respect to FIG. 2, these modifications produce, for example, an angle of inclination at point P1 of 7.6° and a radial extent of arc A of 7.3 mm.

FIG. 4 also differs from FIG. 2 in that the tapered sealing surface 12 is replaced by a rounded sealing surface 12', i.e. a surface the profile of which is a convex arc, cooperating with the tapered sealing surface 10. The profile of the on-lip sealing surface 10 has a break in slope PA, advantageously formed by a concave rounding, with respect to the rectilinear profile of the cylindrical surface portion 21.

Figure 5:
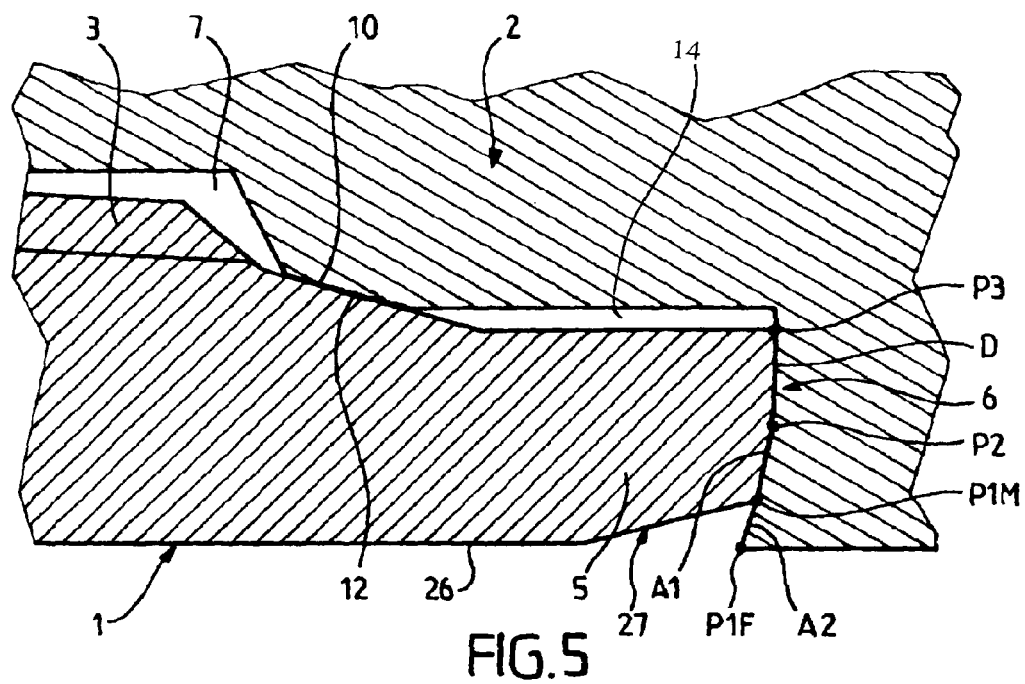
Figure 6:
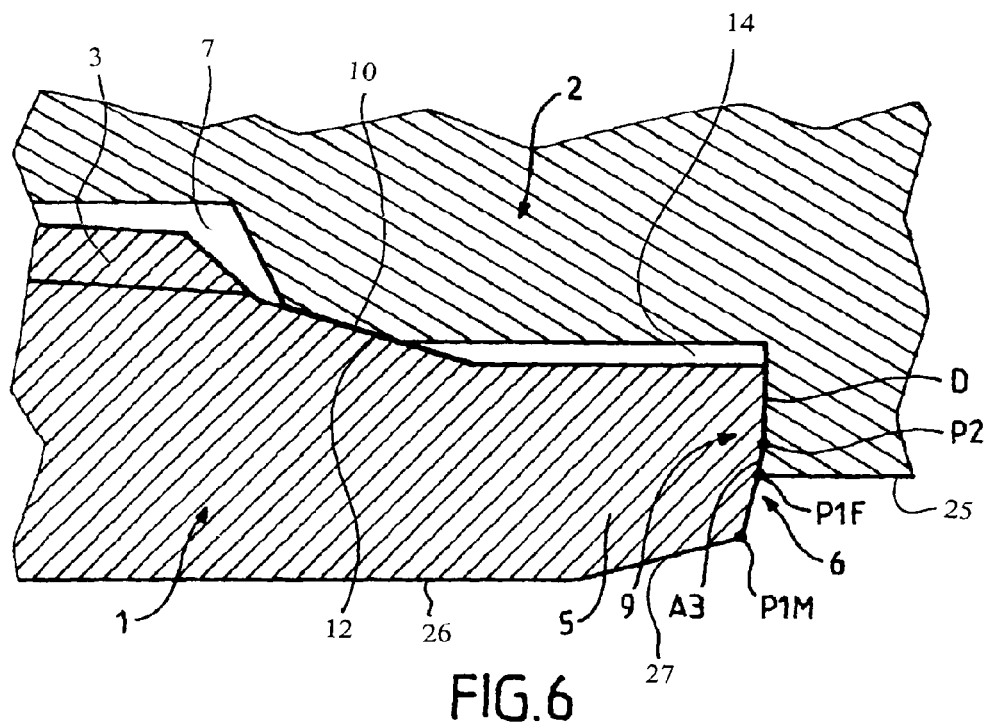

In the examples of FIGS. 5 and 6, as in that of FIGS. 1 and 2, the inner cylindrical surface 26 of the tube comprising the male element 1 is connected to the end surface 6 of the lip 5, via a machined tapered surface 27.

The female element 2 of FIG. 5 is identical to that of FIGS. 1 and 2, while the diameters of the inner surfaces 26 and 27 of the male element are greater than those of the homologous surfaces of FIGS. 1 and 2. The profile of the axial abutment surfaces of elements 1 and 2 comprises, in addition to the straight segment D described in relation to FIGS. 1 and 2, an arc of a circle A1 which extends from the point P2 to a point P1M which represents the axial half-section profile of the distal end of the tapered surface 27. The axial half-section of the end surface of the housing 7 also comprises an arc of a circle A2 which extends the arc A1 from the point P1M to a point P1F. Arcs A1 and A2 together form an arc of a circle identical to the arc A of FIGS. 1 and 2.

A comparison of FIGS. 2 and 5 shows that, in the first figure the mean inclination of the axial abutment surfaces 6, 9 is greater, so that a large radially outward thrust is exerted on the end of the lip, which is necessary, because of the stiffness of the latter, to obtain an effective radial interference fit between the sealing surfaces 10, 12. In FIG. 5, a lower mean inclination of the axial abutment surfaces and a lower radial thrust on the end of the lip allows bending to be avoided, because of the lower stiffness of the latter due to its smaller thickness.

By way of example, for a threaded connection with a nominal diameter of 177.8 mm (7 inches) and a weight per length unit of 43.1 kg/m (29 lb/ft) for the male element and 52 kg/m (35 lb/ft) for the female element, the angle of inclination of the point P1M may be 2.6° and the radial extent of arc A1 2.5 mm.

In FIG. 6, the diameter of the inner cylindrical surface 25 of the female element 2 is increased to be greater than the maximum diameter of the tapered surface 27. Under these conditions, the half-section of the axial end surface 6 of the lip 5 comprises all of the arc of a circle A described above, from point P2 to point P1M, the half-section of the end surface 9 of the housing 7 comprising only a portion A3 of said arc, adjacent to the straight segment D and terminating at a point P1F.

FIGS. 5 and 6 show that a male element and a female element with the same diameter but different linear densities may be made up together: points P2 and P3 are in identical positions on such elements, points P1M and P1F varying with the weight per length unit of the elements.

Figure 7:
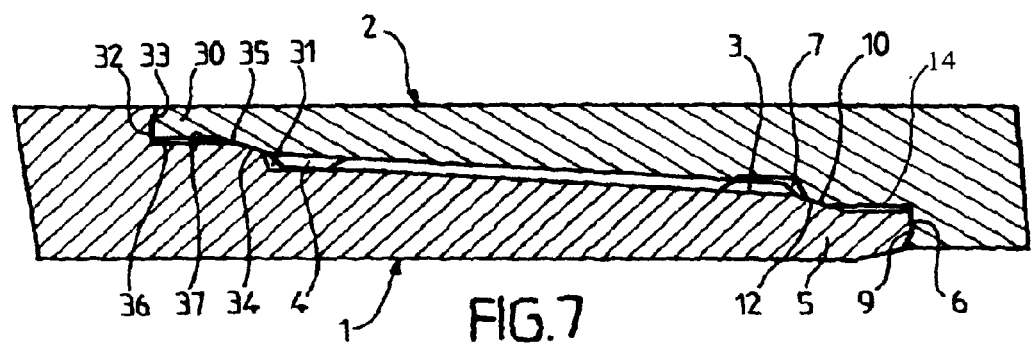
FIG. 7 is an analogous view to FIG. 1, showing a further variation of the connection.

The connection of FIG. 7 differs from that of FIGS. 1 and 2 in that the female element 2 has a lip 30 and the male element 1 has a housing 31 receiving said lip, the lip 30 and housing 31 being disposed axially opposite the lip 5 and the housing 7 with respect to the threadings 3 and 4. The lip 30 and the housing 31 have respective axial abutment surfaces 32, 33, respective sealing surfaces 34, 35 and respective cylindrical surfaces 36, 37 analogous to the surfaces 6, 9, 10, 12, 21 and 22 described above, but in a reversed disposition both in the axial direction and in the radial direction.

Clearly, it is possible in accordance with the invention to dispense with the axial abutment surfaces 6, 9 and the sealing surfaces 10, 12 of the lip 5 and the housing 7 of FIG. 7, the seal being provided solely by surfaces 32 to 35.

Further, while a rounded sealing surface has been described as being formed only on the housing of the female element, in a variation such a rounded sealing surface may be formed on the lip of the male element and/or on the lip of the female element or on the housing of the male element.

The invention claimed is:

1. A threaded tubular connection comprising:
a male tubular element comprising a male threading;
a female tubular element comprising a female threading that can cooperate with the male threading on makeup;
an annular axial abutment surface on said male tubular element and an annular sealing surface disposed on a radially outer surface of said male tubular element,
an annular axial abutment surface on said female tubular element and an annular sealing surface disposed on a radially inner surface of said female tubular element,
the axial abutment surfaces coming into mutual abutment at the end of makeup while the sealing surfaces come into sealing contact by radial interference, one of the axial abutment surfaces as a distal abutment surface being formed at a free end of a first of said tubular elements, which first element includes a lip that extends axially between its threading and the distal abutment surface, and one of the sealing surfaces as an on-lip sealing surface being disposed on the lip at a non-zero axial distance from the distal abutment surface,
wherein a segment constituting at least a portion of axial half-sections of each of the axial abutment surfaces is inclined with respect to the radial direction, said segment axially approaching said threadings with an increasing inclination so that on going from said radially outer or inner surface, said axial half-sections do not change their direction of inclination,
wherein said axial half-sections are radially orientated at the end thereof close to said radially outer or inner surface, and
wherein said inclined segment is radially orientated at an end thereof close to said radially outer or inner surface where said inclined segment connects to a straight radial segment that also forms part of said axial half-sections.

2. A threaded tubular connection according to claim 1, in which the first tubular element is the male element.

3. A threaded tubular connection according to claim 1, in which said segment is curvilinear.

4. A threaded tubular connection according to claim 3, in which said segment is an arc of a circle.

5. A threaded tubular connection according to claim 4, in which a radius of said arc of a circle is in a range of 20 to 100 mm.

6. A threaded tubular connection according to claim 1, in which a maximum angle of inclination of said segment is 20° or less.

7. A threaded tubular connection according to claim 1, in which a length of said straight radial segment is in a range of 0.5 to 6 mm.

8. A threaded tubular connection according to claim 1, in which a radial clearance exists between facing surfaces of the male and female elements over said axial distance.

9. A threaded tubular connection according to claim 1, in which the on-lip sealing surface is separated from the threading by an axial distance of at most 3 thread pitches.

10. A threaded tubular connection according to claim 1, in which said threadings are tapered.

11. A threaded tubular connection according to claim 1, in which the sealing surfaces are respectively a tapered surface and a rounded surface.

12. A threaded tubular connection according to claim 1, in which, of said sealing surfaces, the tapered surface is said on-lip sealing surface.

13. A threaded tubular connection according to claim 1, in which at least one of said sealing surfaces is limited towards the distal abutment surface by a break in slope.

14. A threaded tubular connection according to claim 1, in which facing surfaces of the male and female elements between the sealing surfaces and the axial abutment surfaces comprise surfaces that are cylindrical over said axial distance.

15. A threaded tubular connection according to claim 1, in which the on-lip sealing surface is separated from the threading by an axial distance of at most 2 thread pitches.

16. A threaded tubular connection comprising:
a male tubular element comprising a male threading;
a female tubular element comprising a female threading that can cooperate with the male threading on makeup;
an annular axial abutment surface on said male tubular element and an annular sealing surface disposed on a radially outer surface of said male tubular element,
an annular axial abutment surface on said female tubular element and an annular sealing surface disposed on a radially inner surface of said female tubular element,
the axial abutment surfaces coming into mutual abutment at the end of makeup while the sealing surfaces come into sealing contact by radial interference, one of the axial abutment surfaces as a distal abutment surface being formed at a free end of a first of said tubular elements, which first element includes a lip that extends axially between its threading and the distal abutment surface, and one of the sealing surfaces as an on-lip sealing surface being disposed on the lip at a non-zero axial distance from the distal abutment surface,
wherein a segment constituting at least a portion of axial half-sections of each of the axial abutment surfaces is inclined with respect to the radial direction, said segment axially approaching said threadings with an increasing inclination so that on going from said radially outer or inner surface, said axial half-sections do not change their direction of inclination, and
wherein the lip is thickened locally by increasing an angle of inclination at a free end of the lip to increase a surface area for axial abutment.

* * * * *

UNITED STATES PATENT AND TRADEMARK OFFICE
CERTIFICATE OF CORRECTION

PATENT NO. : 8,287,008 B2
APPLICATION NO. : 11/997920
DATED : October 16, 2012
INVENTOR(S) : Jean-Francois Charvet-Quemin et al.

It is certified that error appears in the above-identified patent and that said Letters Patent is hereby corrected as shown below:

Column 8, line 9, Claim 12, change "according to claim 1" to --according to claim 11--.

Signed and Sealed this
Twenty-second Day of January, 2013

David J. Kappos
*Director of the United States Patent and Trademark Office*